US012693235B2

(12) United States Patent
Tanila et al.

(10) Patent No.: US 12,693,235 B2
(45) Date of Patent: Jul. 28, 2026

(54) DRIVE CONDITION MONITORING

(71) Applicant: ABB Schweiz AG, Baden (CH)

(72) Inventors: Teemu Tanila, Helsinki (FI); Olli Alkkiomäki, Helsinki (FI); Joni Siimesjärvi, Laihia (FI)

(73) Assignee: ABB SCHWEIZ AG, Baden (CH)

( * ) Notice: Subject to any disclaimer, the term of this patent is extended or adjusted under 35 U.S.C. 154(b) by 198 days.

(21) Appl. No.: 18/426,428

(22) Filed: Jan. 30, 2024

(65) Prior Publication Data

US 2024/0280503 A1 Aug. 22, 2024

(30) Foreign Application Priority Data

Feb. 20, 2023 (EP) ..................................... 23157482

(51) Int. Cl.
G01N 21/88 (2006.01)
G06V 10/141 (2022.01)
(Continued)

(52) U.S. Cl.
CPC ..... G01N 21/8851 (2013.01); G01N 21/8806 (2013.01); G06V 10/141 (2022.01); G06V 10/56 (2022.01); G06V 10/60 (2022.01)

(58) Field of Classification Search
CPC ........... G01N 21/94; G01N 2015/1006; G01N 15/1456; G01N 2001/282; G01N 21/35; G01N 21/65; G01N 15/06; G01N 2021/656; G01N 21/474; G01N 33/57407; G01N 2021/6419; G01N 2021/4745; G01N 2021/4759; G01N 21/00; G01N 21/47; G01N 21/6428; G01N 21/6456; G01N 2201/0221; G01N 1/2247; G01N 1/405; G01N 2021/6421; G01N 21/05;
(Continued)

(56) References Cited

U.S. PATENT DOCUMENTS 6,661,912 B1 12/2003 Taguchi et al.
2014/0193042 A1* 7/2014 Allen .................... G06T 7/0004
382/108
2023/0011225 A1* 1/2023 Armbruster, Jr. ...... G01N 21/94

FOREIGN PATENT DOCUMENTS

CN 108760755 A * 11/2018 ......... G01N 21/8851
CN 109459354 A * 3/2019 ............. G01N 15/04
(Continued)

OTHER PUBLICATIONS

Juha Pippola; et al.; "Development of dust test method for motor drives" ; 2017 IMAPS Nordic Conference on Microelectronics Packaging (NORDPAC);IEEE Jun. 18, 2017; 4 Pages.
(Continued)

*Primary Examiner* — Michael P Stafira

(74) *Attorney, Agent, or Firm* — Greenberg Traurig, LLP

(57) ABSTRACT
A computer-implemented method for condition monitoring of an industrial drive. According to an aspect, the method includes: obtaining an image of a component surface of the industrial drive, wherein the image includes a first number of pixels; determining, using the image and at least one reference image for the component surface, a contamination index of the image, wherein the at least one reference image includes the first number of pixels; and triggering, in response to the contamination index being above a predetermined first threshold, a maintenance warning.

16 Claims, 2 Drawing Sheets

(51) Int. Cl.
    *G06V 10/56*    (2022.01)
    *G06V 10/60*    (2022.01)

(58) Field of Classification Search
    CPC ............... G01N 21/274; G01N 21/956; G01N 33/54326; G01N 1/2208; G01N 1/2214; G01N 15/075; G01N 2021/3595; G01N 2021/6439; G01N 2035/00782; G01N 2201/061; G01N 23/222; G01N 27/72; G01N 29/4436; G01N 33/24; G01N 33/5011; G01N 33/54333; G01N 33/574; G01N 35/00732; G01N 1/14; G01N 1/2205; G01N 15/02; G01N 15/05; G01N 15/0806; G01N 15/0826; G01N 2001/045; G01N 2015/1497; G01N 2021/0346; G01N 2035/00148; G01N 2035/00158; G01N 21/03; G01N 21/3504; G01N 21/3577; G01N 21/6458; G01N 21/6486; G01N 2201/02; G01N 27/00; G01N 2800/52; G01N 33/50; G01N 33/53; G01N 33/5434; G01N 33/54366; G01N 33/6839; G01N 35/00029; G01N 35/0098; G01N 7/10; G01N 1/02; G01N 1/20; G01N 1/2211; G01N 1/2273; G01N 1/24; G01N 15/00; G01N 15/0255; G01N 15/0606; G01N 15/0612; G01N 15/0625; G01N 15/0637; G01N 15/0656; G01N 15/10; G01N 15/1433; G01N 2001/2223; G01N 2001/244; G01N 2015/016; G01N 2015/018; G01N 2021/1795; G01N 2021/354; G01N 2021/399; G01N 2021/4709; G01N 2021/6432; G01N 2021/6441; G01N 21/031; G01N 21/31; G01N 21/359; G01N 21/39; G01N 21/53; G01N 21/538; G01N 21/55; G01N 21/645; G01N 21/9501; G01N 2203/022; G01N 2203/0246; G01N 2223/643; G01N 2291/014; G01N 2291/02845; G01N 2291/02881; G01N 2291/102; G01N 25/04; G01N 27/08; G01N 27/49; G01N 29/043; G01N 29/14; G01N 29/2418; G01N 29/30; G01N 29/38; G01N 29/4427; G01N 29/4445; G01N 29/4454; G01N 29/50; G01N 33/0037; G01N 33/0077; G01N 33/0098; G01N 33/02; G01N 33/56911; G01N 33/56961; G01N 1/28; G01N 1/30; G01N 1/312; G01N 1/36; G01N 11/14; G01N 15/0211; G01N 15/1434; G01N 15/1459; G01N 15/1484; G01N 15/149; G01N 2001/007; G01N 2001/307; G01N 2001/388; G01N 2011/0066; G01N 2015/1438; G01N 2015/1452; G01N 2021/3513; G01N 2021/6417; G01N 2021/8864; G01N 2035/00881; G01N 21/253; G01N 21/278; G01N 21/64; G01N 21/6408; G01N 21/643; G01N 21/6452; G01N 21/6489; G01N 21/87; G01N 21/8806; G01N 21/8851; G01N 21/89; G01N 21/95; G01N 21/9506; G01N 21/9515; G01N 21/95607; G01N 2201/0227; G01N 2201/0245; G01N 2201/06113; G01N 2201/12; G01N 2201/127; G01N 2291/0256; G01N 2291/02809; G01N 2291/02818; G01N 2291/0423; G01N 2291/0426; G01N 2333/75; G01N 2333/78; G01N 24/081; G01N 2500/00; G01N 27/023; G01N 27/041; G01N 27/06; G01N 27/20; G01N 27/22; G01N 27/223; G01N 27/3271; G01N 27/82; G01N 2800/7028; G01N 29/022; G01N 29/036; G01N 33/0036; G01N 33/241; G01N 33/2823; G01N 33/389; G01N 33/49; G01N 33/497; G01N 33/5017; G01N 33/5091; G01N 33/542; G01N 33/54353; G01N 33/54393; G01N 33/57438; G01N 33/57484; G01N 35/1095; G01N 35/1097; G01N 5/00; G01N 7/14
    See application file for complete search history.

(56)                References Cited

FOREIGN PATENT DOCUMENTS

| CN | 113284148 A | * | 8/2021 | ............ G01N 21/94 |
|----|-------------|---|--------|------------|
| CN | 114049490 A | * | 2/2022 | ............ G06N 3/045 |
| CN | 119811023 A | * | 4/2025 | |
| EP | 3206161 A1 | * | 8/2017 | ............ G06V 10/56 |
| GB | 2553830 A | * | 3/2018 | ............ G01N 21/84 |

OTHER PUBLICATIONS

European Search Report; Application No. EP23157482; Completed: Jul. 14, 2023; 2 Pages.

* cited by examiner

DRIVE CONDITION MONITORING

TECHNICAL FIELD

The invention relates to monitoring drive condition.

BACKGROUND

Industrial drives are operated in environments where small particles such as dust or metals are accumulated. This may cause build-up inside a drive over time and eventually lead into a drive failure and an unplanned shutdown, potentially caused by excessive heat generation, moisture, or conductive particles.

It is non-trivial how to determine when the condition of a drive has reached the point of maintenance demand. Thus, it would be beneficial to find a method for drive condition monitoring that would enable optimizing maintenance cycles and preventing drive failures.

SUMMARY

According to an aspect, there is provided the subject-matter of independent claims. Dependent claims define some embodiments.

Some embodiments provide a computer-implemented method for condition monitoring of an industrial drive, the method comprising obtaining an image of a component surface of the industrial drive, determining, using the image and at least one reference image for the component surface, a contamination index of the image, and triggering, in response to the contamination index being above a predetermined first threshold, a maintenance warning.

BRIEF DESCRIPTION OF DRAWINGS

In the following, various example embodiments will be described in greater detail with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments/examples to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

The present invention is applicable to any apparatus, system, or equipment that is configured or configurable to monitor condition of one or more industrial drives. Different embodiments and examples are described below using single units, models, equipment, and memory, without restricting the embodiments/examples to such a solution. Concepts called cloud computing and/or virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices, or hosts. In cloud computing network devices, computing devices, and/or storage devices provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment.

Figure 1:
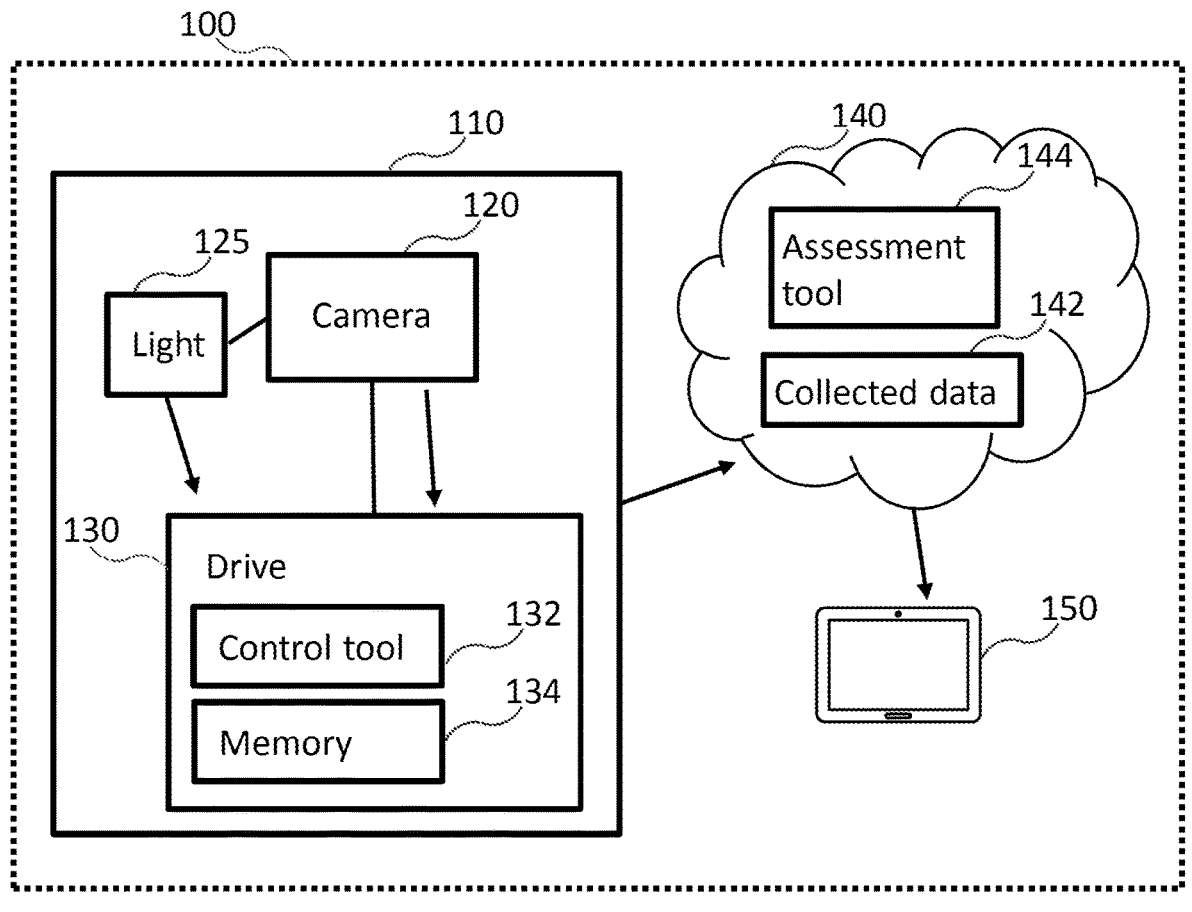
FIG. 1 shows simplified architecture of a system.

A general exemplary architecture of a system performing drive condition monitoring is illustrated in FIG. 1. FIG. 1 is a simplified system architecture showing only some devices, apparatuses, and functional entities, all being logical units whose implementation and/or number may differ from what is shown. The connections shown in FIG. 1 are logical connections; the actual physical connections may be different. It is apparent to a person skilled in the art that the system comprises any number of shown elements, other equipment, other functions, and other structures that are not illustrated. They, as well as the protocols used, are well known by persons skilled in the art and are irrelevant to the actual invention. Therefore, they need not to be discussed in more detail here.

In the example illustrated by FIG. 1, the system 100 comprises one or more drive enclosures 110 (only one illustrated in FIG. 1) comprising a variable-frequency drive 130 located, for example, in an industrial plant. The variable-frequency drive 130 is connected over one or more networks (none shown in FIG. 1) to one or more clouds 140 or cloud platforms (only one illustrated in FIG. 1) which are connected over one or more networks to one or more user devices 150. Alternatively, the variable-frequency drive may be connected over one or more networks to an edge device that is connected over one or more networks to the one or more clouds 140. Edge devices are pieces of equipment that may transmit data between a local network and a cloud. The drive enclosure 110 comprises also at least one digital camera 120 and at least one lighting source 125. The one or more networks may be any wired or wireless network, or a combination thereof, enabling transmission of information between different apparatuses/devices over the network. These include, but are not limited to, local area networks (LAN), cellular networks, and wireless local area networks (WLAN).

The at least one digital camera 120 is fixedly installed in the drive enclosure in relation to the drive 130. The at least one lighting source 125 may be an internal lighting source of the camera 120 or an external lighting source connected to the camera 120 and fixedly installed in relation to the drive and/or camera. The lighting source 125 may be, for example, a light-emitting diode (LED) light. The direction of light from the lighting source 125 is fixed in relation to the drive 130. The camera 120 is configured to capture images of the drive 130 by illuminating a component surface of the drive 130 such as, e.g., a power unit board surface, with the lighting source 125 and capturing light that is reflected from the component surface of the drive 130. The camera 120 may be equipped with a colour sensor, such as an RGB colour sensor. The digital camera 120 is configured to capture image data, for example, periodically at regular time intervals, and store the image data to a control tool 132 of the drive 130 or a memory 134 of the drive. Alternatively, the camera 120 may be configured to transmit the image data to a cloud 140.

The variable-frequency drive 130 may be used in electro-mechanical drive systems for controlling an alternating current (AC) motor speed and/or torque by varying, for example, frequency, current, and/or voltage of an electrical supply to the motor. The variable-frequency drive 130 may be called an adjustable-frequency drive, a variable-voltage drive, a variable-speed drive, an alternating current (AC) drive, a micro drive, or an inverter drive, or herein shortly a drive. The drive 130 comprises the control tool 132 for adjusting and controlling the functions of the drive 130. The drive 130 may store in the memory 134, which may be internal or external, the image data received from the digital camera 120.

In the cloud-based deployment, the one or more clouds 140 provide, for example, condition monitoring service for remote support using collected data 142 stored in the cloud 140 and performing assessment 144 in the cloud 140. In the illustrated example of FIG. 1, the collected data 142 stored in the cloud 140 comprise at least the image data captured by the at least one digital camera 120 and obtained from the drive enclosure 110. The collected data 142 may comprise also other data, such as pre-determined thresholds for drive condition parameters and results from previous condition assessments. An assessment tool or an assessment unit 144 may be a condition monitoring tool configured to, for example, identify one or more drive condition parameters indicative of a developing fault in the drive 130. The details of how data are stored in the cloud or in any other shared data storage for condition monitoring are not relevant for the implementation and therefore they are not described in more detail here. It is obvious for one skilled in the art that any known or future storage method may be used. Further, implementing the examples described herein using a non-cloud deployment for remote support is a straightforward task for one skilled in the art.

The assessment tool 144 is also configured to trigger a maintenance warning to the one or more user devices 150. A user device 150 refers to a computing device (equipment, apparatus) that may be a portable device or a desktop device such as a personal computer, and it may also be referred to as a user terminal or a user apparatus. Portable computing devices (apparatuses) include wireless mobile communication devices operating with or without a subscriber identification module (SIM) in hardware or in software, including, but not limited to, the following types of devices: a mobile phone, a smartphone, a personal digital assistant (PDA), a handset, a laptop and/or touch screen computer, a tablet (tablet computer), a multimedia device, a wearable computer, and other types of wearable devices, such as clothing and accessories incorporating computer and advanced electronic technologies. The user device 150 may comprise one or more user interfaces. The one or more user interfaces may be any kind of a user interface, for example a screen, a keypad, a loudspeaker, a microphone, a touch user interface, an integrated display device, and/or an external display device. The user device 150 may be configured to perform the maintenance warning triggered by the assessment tool 144. For that purpose, the user device 150 may be capable of installing applications. The maintenance warning may be, for example, a text message, an image message, a sound alarm, or a flashing light.

In another example, the collected data 142 are stored in the memory 134 of the drive 130, the assessment tool 144 is comprised in the control tool 132 of the drive 130, and the drive may be connected to the user device 150 over the one or more networks. Alternatively, the user device 150 may be located in the vicinity of the drive 130 and the drive 130 may be connected to the user device 150 over a short-range wireless connection such as Bluetooth, over a Universal Serial Bus (USB) connection, or via near-field communication (NFC). Assessment for condition monitoring is performed in the control tool 132 of the drive 130 and the control tool 132 is configured to trigger a maintenance warning directly to the user device 150.

Figure 2:
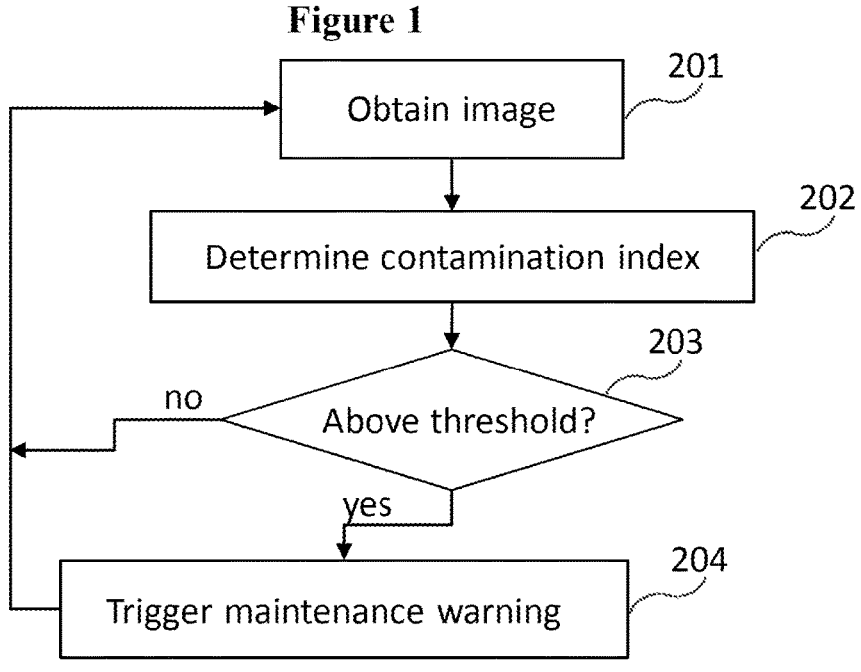
FIGS. 2 and 3 are flow charts illustrating example functionalities.

In the illustrated example of FIG. 2, assessment for drive condition monitoring is performed by determining a contamination index. The contamination index can be used to estimate a need of maintenance for the drive. The monitoring is performed periodically at pre-determined time intervals, for example, hourly, daily, or weekly, to reduce unplanned or interruptive maintenance downtime. Unplanned maintenance time may occur due to, for example, a drive failure caused by contamination. On the other hand, the condition monitoring may be used to reduce unnecessary cleaning of the drive when it is still substantially uncontaminated.

Referring to FIG. 2, an image captured by a digital camera is obtained in block 201. The image may be received by the assessment tool from the control tool of the drive, or the image may be received directly from the digital camera. Alternatively, the image may have been stored earlier in the collected data in the cloud and may now be retrieved by the assessment tool. The image comprises a first number of pixels. The image may be a grayscale image, or it may comprise a second number of colour channels, such as RGB channels or CMYK channels. A contamination index of the image is determined in block 202 using at least one reference image. The at least one reference image is an image captured by the installed digital camera from the component surface of the drive while it is clean, for example, immediately after the drive is installed or immediately after a maintenance cleaning is performed. An angle of light and an angle of view used for capturing are same for both the at least one reference image and the image. The at least one reference image may be stored together with a unique identifier, for example, an identifier of the drive such as a serial number, to enable matching the at least one reference image to the corresponding drive. The contamination index may be determined by calculating, per a pixel of the first number of pixels, an absolute value of a deviation of an intensity value of the image from an intensity value of the at least one reference image, and adding together, for the first number of pixels, the absolute values calculated. This calculation of the contamination index may be expressed as an equation $$\text{contamination\_index} = \sum\nolimits_{x} \sum\nolimits_{y} |\text{img\_ref}_{xy} - img_{xy}|,$$

where img denotes the image, img_ref denotes the at least one reference image, and x and y denote the coordinates of an image pixel of the first number of image pixels. If the image and the at least one reference image comprise a second number of colour channels, wherein the second number is greater than one, the contamination index may be determined by calculating, per a colour channel of the second number of colour channels and per a pixel of the first number of pixels, an absolute value of a deviation of an intensity value of the image from an intensity value of the at least one reference image, and adding together, for the first number of pixels and for the second number of colour channels, the absolute values calculated. This calculation of the contamination index may be expressed as an equation $$\text{contamination\_index} = \sum_i \sum_x \sum_y \left| \text{img\_ref}_{ixy} - img_{ixy} \right|,$$

where img denotes the image, img_ref denotes the at least one reference image, x and y denote the coordinates of an image pixel of the first number of image pixels, and i denotes an index of a colour channel of the second number of colour channels.

If the at least one reference image comprises two or more reference images, then an average such as, e.g., a mean or a median of the intensity values of the two or more reference images may be used in the determination of the contamination index. This calculation of the contamination index may be expressed as an equation $$\text{contamination\_index} = \sum_x \sum_y \left| \text{avg\_img\_ref}_{xy} - img_{xy} \right|,$$

where img denotes the image, avg_img_ref denotes the average of the two or more reference images, and x and y denote the coordinates of an image pixel of the first number of image pixels. Alternatively, two or more contamination indexes may be determined, per a reference image of the two or more reference images, and an average such as, e.g., a mean or a median of the two or more contamination indexes may be calculated to obtain the contamination index.

It is determined in block 203 whether the determined contamination index is above a pre-determined threshold. The pre-determined threshold may be determined based on a knowledge of a level of contamination causing drive failure. The level of contamination causing drive failure may be determined, for example, by observing drive contamination of a plurality of drives without performing cleaning maintenance until drive failure occurs. Additionally, or alternatively, a machine-learning model may be trained for determining a suitable threshold. The pre-determined threshold may also be re-determined or adjusted, for example, based on observations made by maintenance personnel. For example, a maintenance warning may have been triggered even though the drive is not contaminated enough to need a cleaning, or an unplanned maintenance downtime may have occurred due to a drive failure even though the maintenance warning was not triggered.

If the contamination index is above the pre-determined threshold (block 203: yes), the maintenance warning is triggered in block 204. The process may continue by, for example, obtaining images periodically and triggering the maintenance warning until the drive is cleaned. Alternatively, obtaining images may be interrupted and then continued, for example, when the maintenance warning is acknowledged as received.

If the contamination index is below the pre-determined threshold (block 203: no), the process continues by obtaining in block 201 another image, for example, after a predetermined time interval has passed. The determined contamination index may be stored in the memory of the assessment unit, for example, for tracking the development of the contamination index of the drive over time.

In an embodiment a single reference image may be used for a plurality of similar drives, for example two or three drives.

Figure 3:
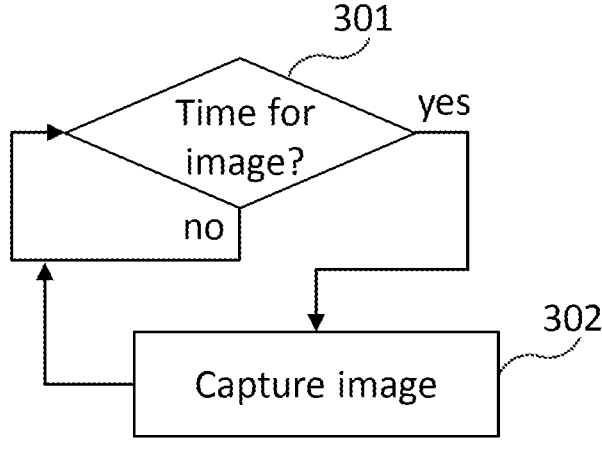

FIG. 3 illustrates an example of capturing images periodically for the drive condition monitoring. It is determined in block 301 if it is time to capture an image of the drive for the contamination assessment. If it is time to capture the image (block 301: yes), the image is captured in block 302 by the digital camera. If it is not yet time to capture the image (block 302: no), the process continues by waiting for the pre-determined time interval to pass. After capturing the image, the image may be stored in the memory of the digital camera or transmitted to the cloud, to the edge device, or to the drive. Further, the drive may store the image in the memory of the drive or transmit the image to the cloud. The image may be stored together with a unique identifier, for example, an identifier of the drive such as a serial number. The identifier of the image may be the identifier stored with the at least one reference image, to enable matching the image to the corresponding at least one reference image and the corresponding drive. Alternatively, the identifier of the image may be mapped with the identifier of the at least one reference image, for example, using a mapping table.

In an embodiment, the at least one reference image may be stored in the digital camera or in the drive, and the assessment tool obtains the image together with the at least one reference image.

The blocks and related functions described above in FIGS. 2 and 3 are in no absolute chronological order, and some of the blocks may be performed simultaneously or in an order differing from the given one. Other functions can also be executed between the blocks or within the blocks. Some of the blocks or part of the blocks can also be left out or replaced by a corresponding block or part of a block.

Utilizing the method for drive condition monitoring enables avoiding periodical maintenance visits of a service engineer to drives that are not in need of a cleaning. It also enables preventing a drive failure caused by not cleaning the drive in time, which may cause costly factory downtimes.

Figure 4:
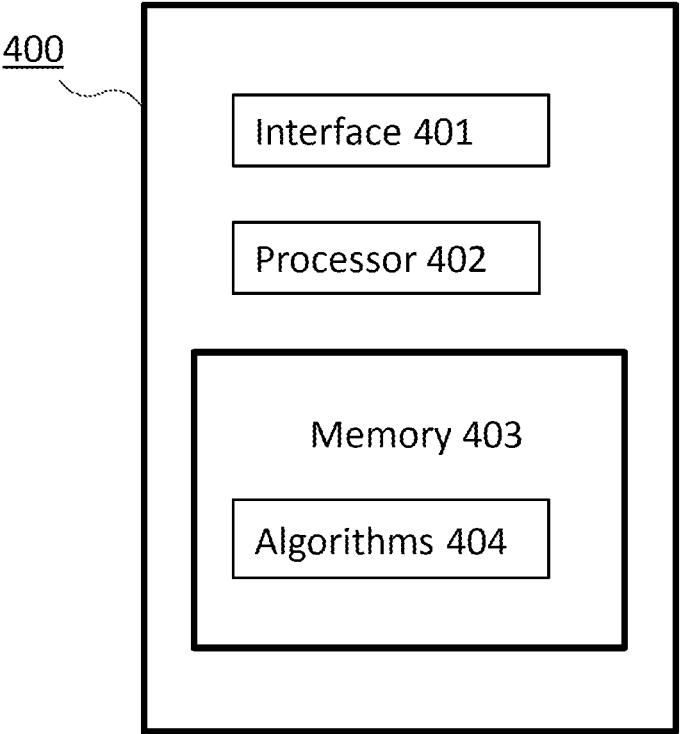
FIG. 4 illustrates an exemplary embodiment of an apparatus.

FIG. 4 is a simplified block diagram illustrating some units for an apparatus (device, equipment) 400 configured to perform at least some functionalities/operations described above, for example by means of FIGS. 1 to 3 and any combination thereof. In the illustrated example, the apparatus 400 comprises one or more interface (IF) entities 401, such as one or more user interfaces, and one or more processing entities 402 connected to various interface entities 401 and to one or more memories 403.

The one or more interface entities 401 are entities for receiving and transmitting information, such as communication interfaces comprising hardware and/or software for realizing communication connectivity according to one or more communication protocols, or for realizing data storing and fetching.

A processing entity 402 is capable of performing calculations and configured to implement at least part of functionalities/operations described above, for example by means of any of FIGS. 1 to 3 and any combination thereof, with corresponding algorithms 404 stored in the memory 403. The processing entity 402 may include one or more processors, controllers, control units, micro-controllers, etc. configurable to carry out embodiments/examples/implementations or operations described above, for example by means of any of FIGS. 1 to 3 and any combination thereof. Generally, a processor is a central processing unit, but the processing entity 402 may be an additional operation processor or a multicore processor or a microprocessor.

A memory 403 is usable for storing a computer program code required for one or more functionalities/operations described above, for example by means of any of FIGS. 1 to 3 and any combination thereof, that is, the algorithms 404 for implementing the functionalities/operations described above by means of any of FIGS. 1 to 3 and any combination thereof. The memory 403 may also be usable for storing, at least temporarily, other possible information required for one or more functionalities/operations described above, for example by means of any of FIGS. 1 to 3 and any combination thereof. The memory may comprise a data buffer that may, at least temporarily, store content for a message before it is sent, or store requested information and content for displaying a message thread or a message.

As a summary, the methods described herein, for example by means of any of FIGS. 1 to 3 and any combination thereof, may be configured as a computer or a processor, or a microprocessor, such as a single-chip computer element, or as a chipset, or one or more logic gates including at least a memory for providing storage area used for arithmetic operations and an operation processor for executing the arithmetic operations. Each or some or one of the algorithms for functions/operations described above, for example by means of any of FIGS. 1 to 3 and any combination thereof, may be comprised in one or more computer processors, application-specific integrated circuits (ASIC), digital signal processors (DSP), digital signal processing devices (DSPD), programmable logic devices (PLD), field-programmable gate arrays (FPGA), graphics processing units (GPU), and/or other hardware components that have been programmed and/or will be programmed by downloading computer program code (one or more algorithms) in such a way as to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus (device, equipment), constitute an entity providing corresponding functionality, or at least part of the corresponding functionality. Programs, also called program products, including software routines, program snippets constituting "program libraries", applets and macros, can be stored in any medium, including nontransitory computer readable storage medium, and may be downloaded into an apparatus. In other words, each or some or one of the algorithms for one or more functions/operations described above, for example by means of any of FIGS. 1 to 3 and any combination thereof, may be comprised in an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

The invention claimed is:

1. A computer-implemented method for condition monitoring of an AC drive, the method comprising:

obtaining an image of a component surface of the AC drive captured by a digital camera fixedly installed in relation to the AC drive, wherein the image includes a first number of pixels;

determining, using the image and at least one reference image for the component surface, a contamination index of the image, wherein the at least one reference image includes the first number of pixels and wherein the at least one reference image is captured by the digital camera fixedly installed in relation to the AC drive before the component surface is exposed to contamination; and triggering, in response to the contamination index being above a pre-determined first threshold, a maintenance warning.

2. The computer-implemented method of claim 1, wherein the obtaining the image comprises receiving the image or retrieving the image from a memory.

3. The computer-implemented method of claim 1, further comprising:

illuminating, by a light source, the component surface at least while capturing the image;

capturing, by the digital camera, light reflected from the component surface; and storing or transmitting the image.

4. The computer-implemented method of claim 1, wherein the determining the contamination index of the image comprises:

calculating, per a pixel of the first number of pixels, an absolute value of a deviation of an intensity value of the image from an intensity value of the at least one reference image; and determining the contamination index by adding together, for the first number of pixels, the absolute values calculated.

5. The computer-implemented method of claim 1, wherein the image and the at least one reference image comprise a second number of colour channels, and the determining the contamination index of the image comprises:

calculating, per a colour channel of the second number of colour channels and per a pixel of the first number of pixels, an absolute value of a deviation of an intensity value of the image from an intensity value of the at least one reference image; and determining the contamination index by adding together, for the first number of pixels and for the second number of colour channels, the absolute values calculated.

6. A condition monitoring system comprising at least:

a digital camera fixedly installed in relation to an AC drive, the digital camera being configured to capture at least one reference image for a component surface of the AC drive before the component surface is exposed to contamination, wherein the at least one reference image includes a first number of pixels, and further configured to capture an image of the component surface of the AC drive including the first number of pixels;

means for determining, using the image and the at least one reference image for the component surface, a contamination index of the image; and means for triggering, in response to the contamination index being above a pre-determined first threshold, a maintenance warning.

7. The condition monitoring system of claim 6, further comprising:

a light source fixedly installed in relation to the AC drive and configured to illuminate the component surface at least while the digital camera is capturing the image.

8. The condition monitoring system of claim 7, wherein the digital camera is configured to capture light reflected from the component surface.

9. The condition monitoring system of claim 6, wherein the means for determining the contamination index are further configured to perform:

calculating, per a pixel of the first number of pixels, an absolute value of a deviation of an intensity value of the image from an intensity value of the at least one reference image; and determining the contamination index by adding together, for the first number of pixels, the absolute values calculated.

10. The condition monitoring system of claim 6, wherein the image and the at least one reference image comprise a second number of colour channels, and the means for determining the contamination index are further configured to perform:

calculating, per a colour channel of the second number of colour channels and per a pixel of the first number of pixels, an absolute value of a deviation of an intensity value of the image from an intensity value of the at least one reference image; and determining the contamination index by adding together, for the first number of pixels and for the second number of colour channels, the absolute values calculated.

11. An arrangement comprising:

a digital camera configured to, when the digital camera is fixedly installed in relation to an AC drive, capture at least one reference image for a component surface of the AC drive before the component surface is exposed to contamination, wherein the at least one reference image comprises a first number of pixels, and further capture an image of the component surface of the AC drive comprising the first number of pixels;

a processor, and a memory storing instructions that, when executed by the processor, cause the processor to:

determine, using the captured image and the at least one reference image for the component surface, a contamination index; and trigger, in response to the determined contamination index exceeding a pre-determined threshold, a maintenance warning.

12. The arrangement of claim 11, further comprising:

a light source configured to be installed in relation to the digital camera and/or to the AC drive and configured to illuminate the component surface at least while the digital camera is capturing the image.

13. The arrangement of claim 12, wherein the digital camera is further configured to capture light reflected from the component surface.

14. The arrangement of claim 11, wherein the determining of the contamination index includes:

calculating, per a pixel of the first number of pixels, an absolute value of a deviation of an intensity value of the image from an intensity value of the at least one reference image; and determining the contamination index by adding together, for the first number of pixels, the absolute values calculated.

15. The arrangement of claim 11, wherein the captured image and the at least one reference image each comprise a second number of colour channels, wherein the determining of the contamination index includes:

calculating, per a colour channel of the second number of colour channels and per a pixel of the first number of pixels, an absolute value of a deviation of an intensity value of the image from an intensity value of the at least one reference image; and determining the contamination index by adding together, for the first number of pixels and for the second number of colour channels, the absolute values calculated.

16. The arrangement of claim 11, wherein the digital camera is further configured to capture images of the component surface of the AC drive periodically.

* * * * *